Sept. 21, 1965 R. L. BEVARD 3,207,329
CARGO HANDLING APPARATUS
Filed Dec. 3, 1962 7 Sheets-Sheet 1
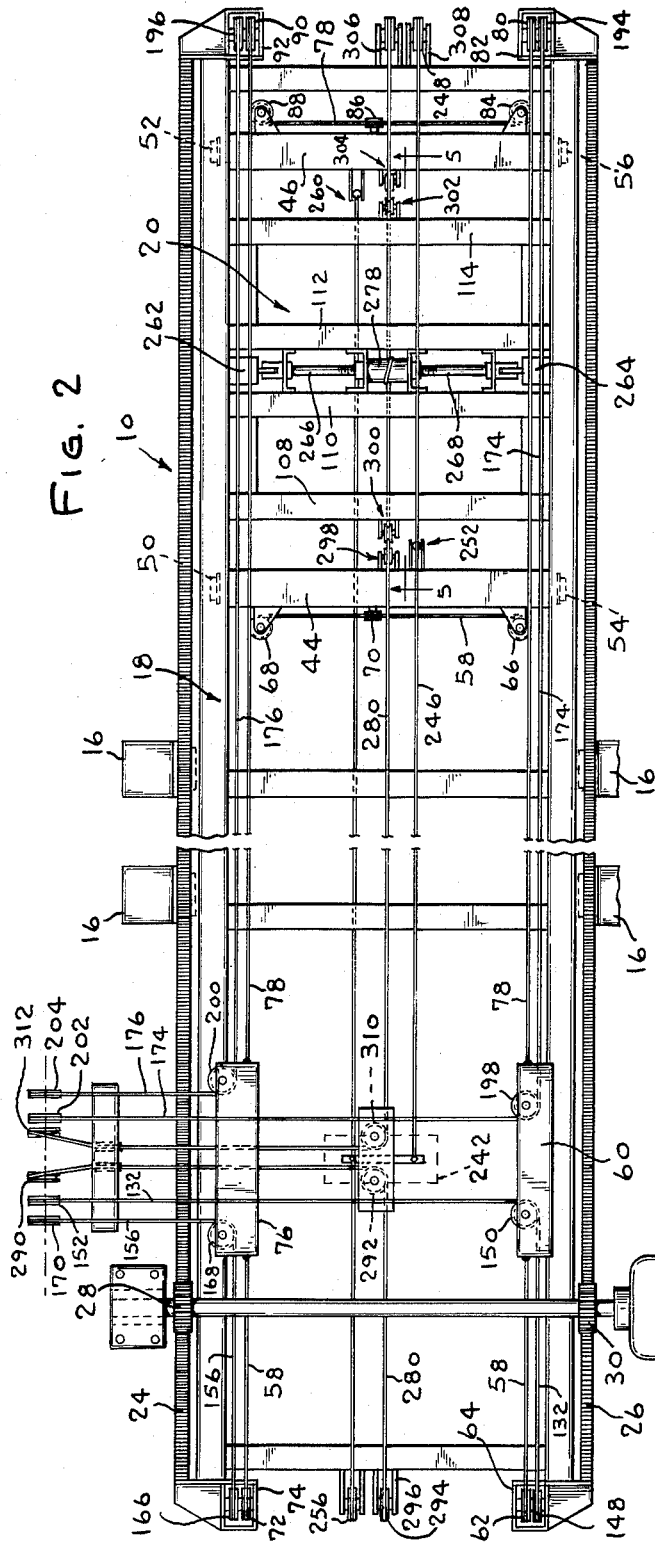
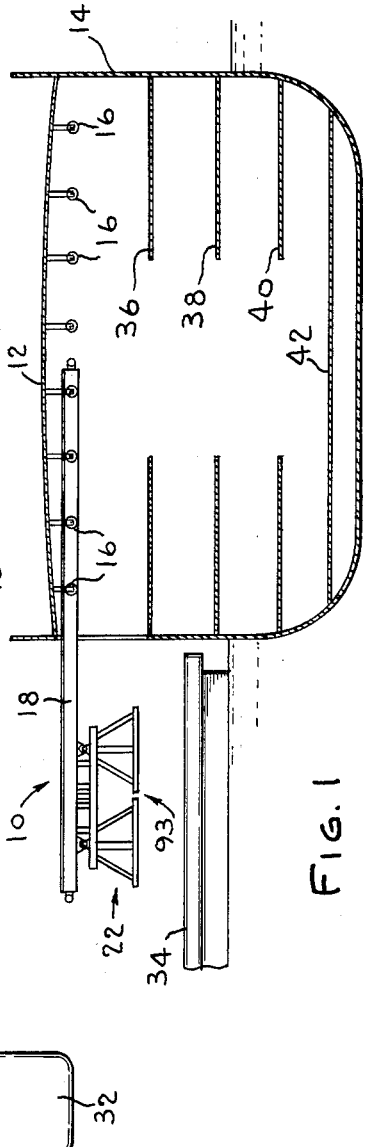
INVENTOR.
ROGER L. BEVARD
BY
Bayard H. Michael
ATTORNEY

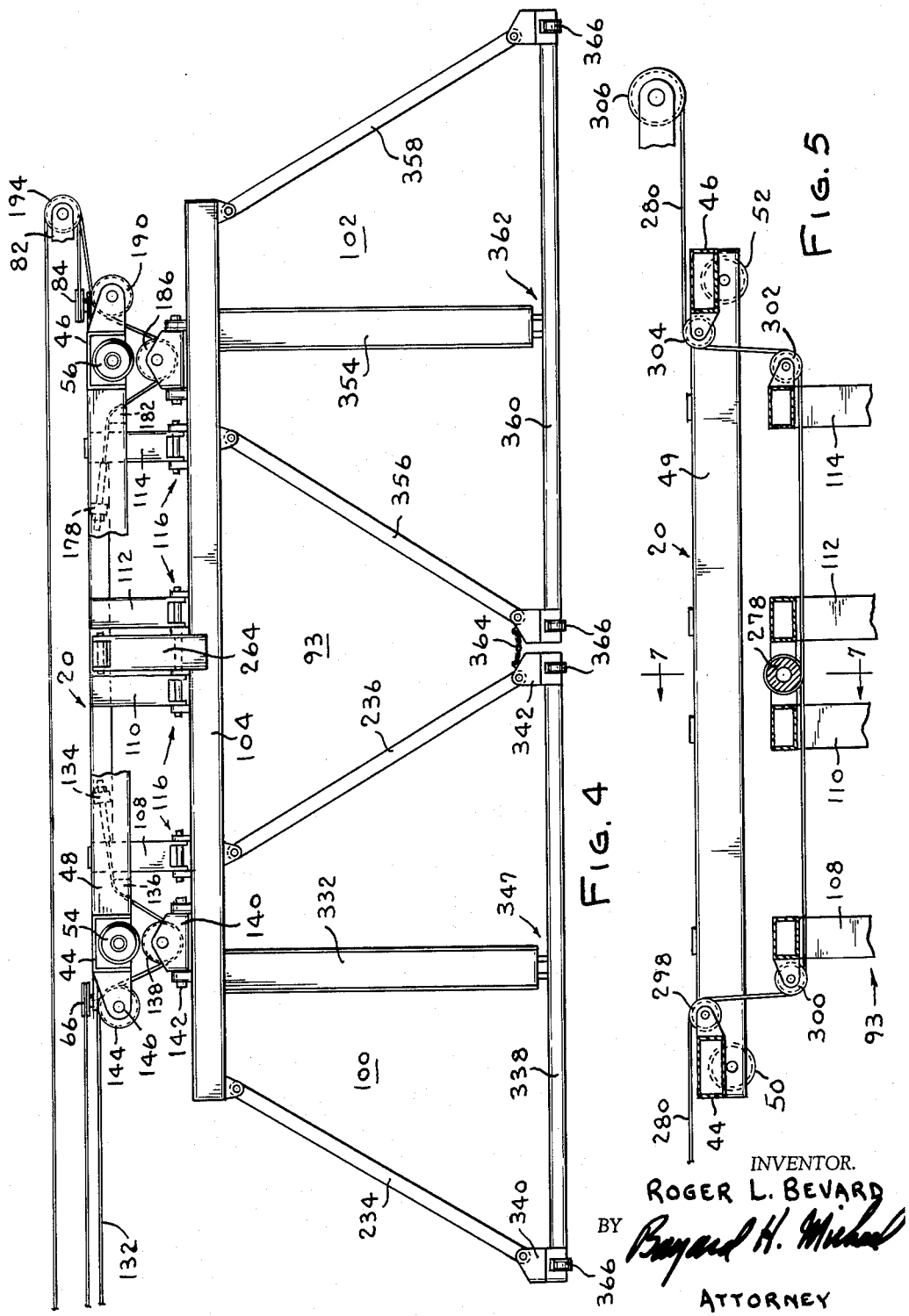

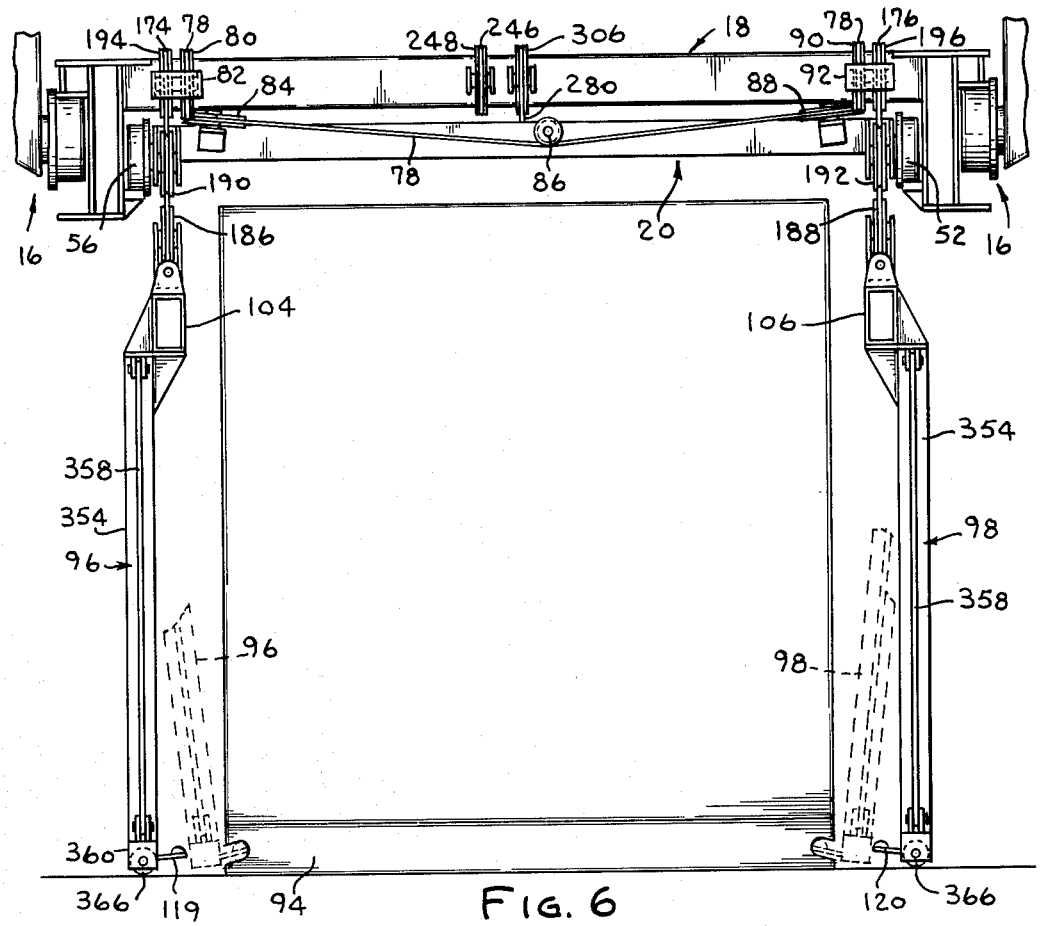
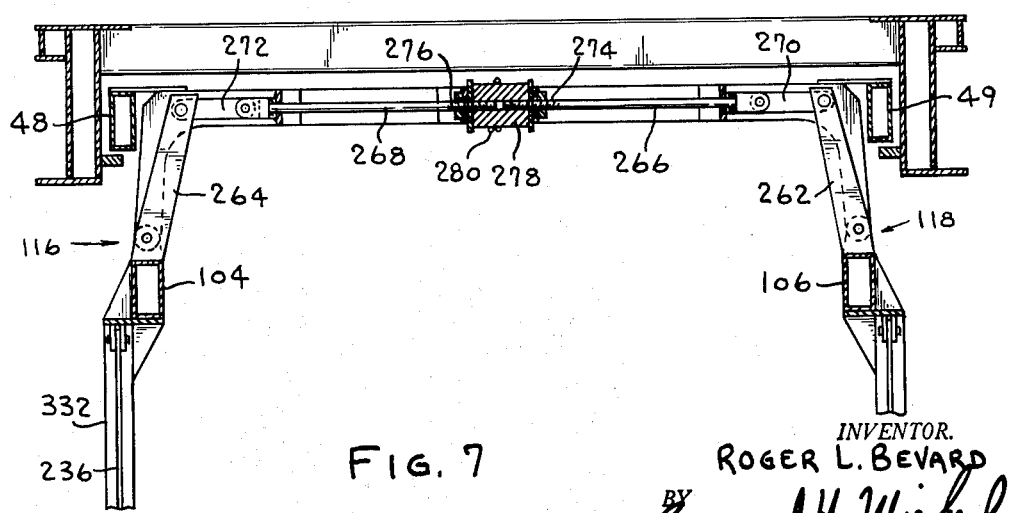

Sept. 21, 1965   R. L. BEVARD   3,207,329
CARGO HANDLING APPARATUS
Filed Dec. 3, 1962   7 Sheets-Sheet 5
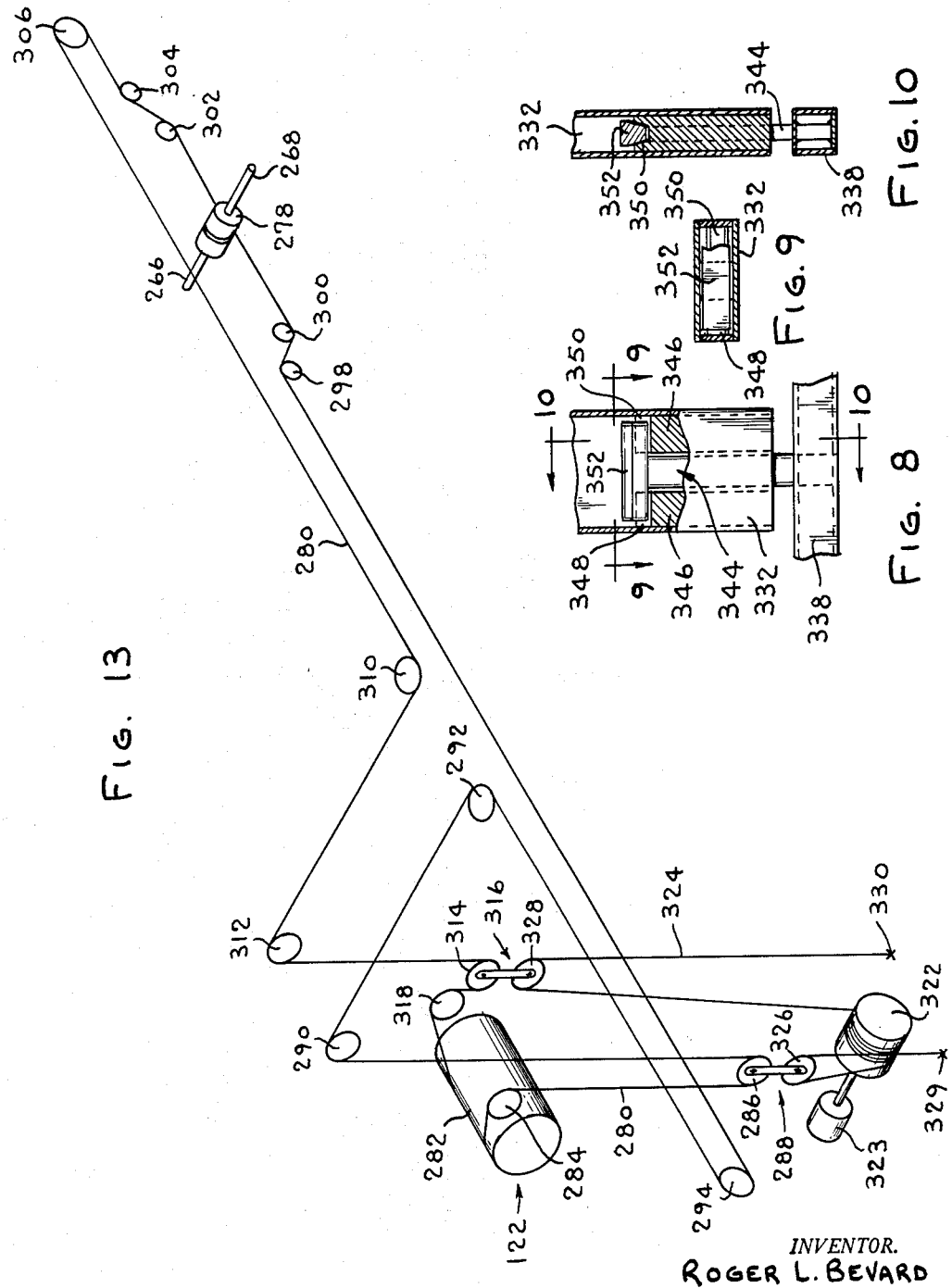
INVENTOR.
ROGER L. BEVARD
BY
Bayard H. Michael
ATTORNEY

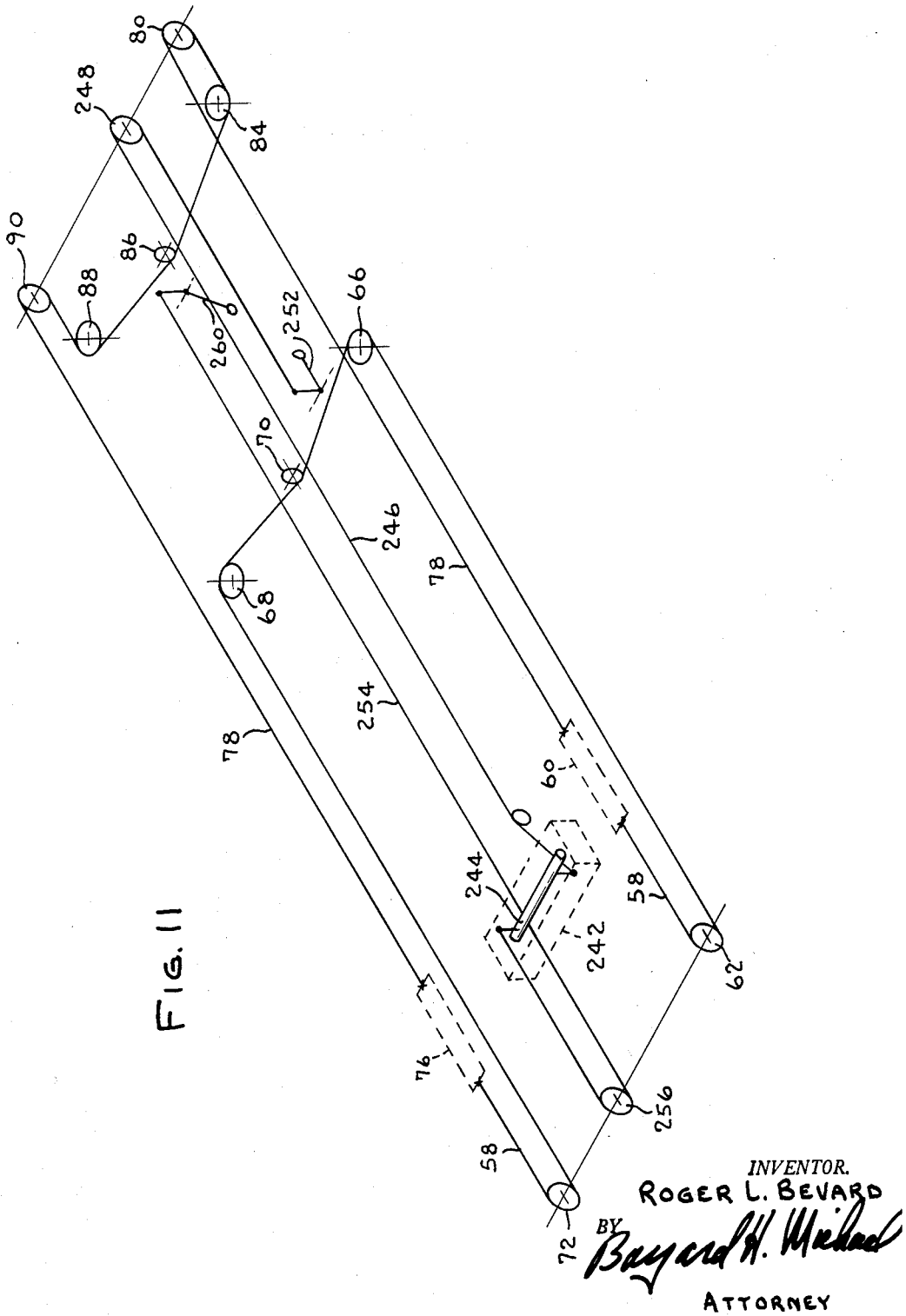

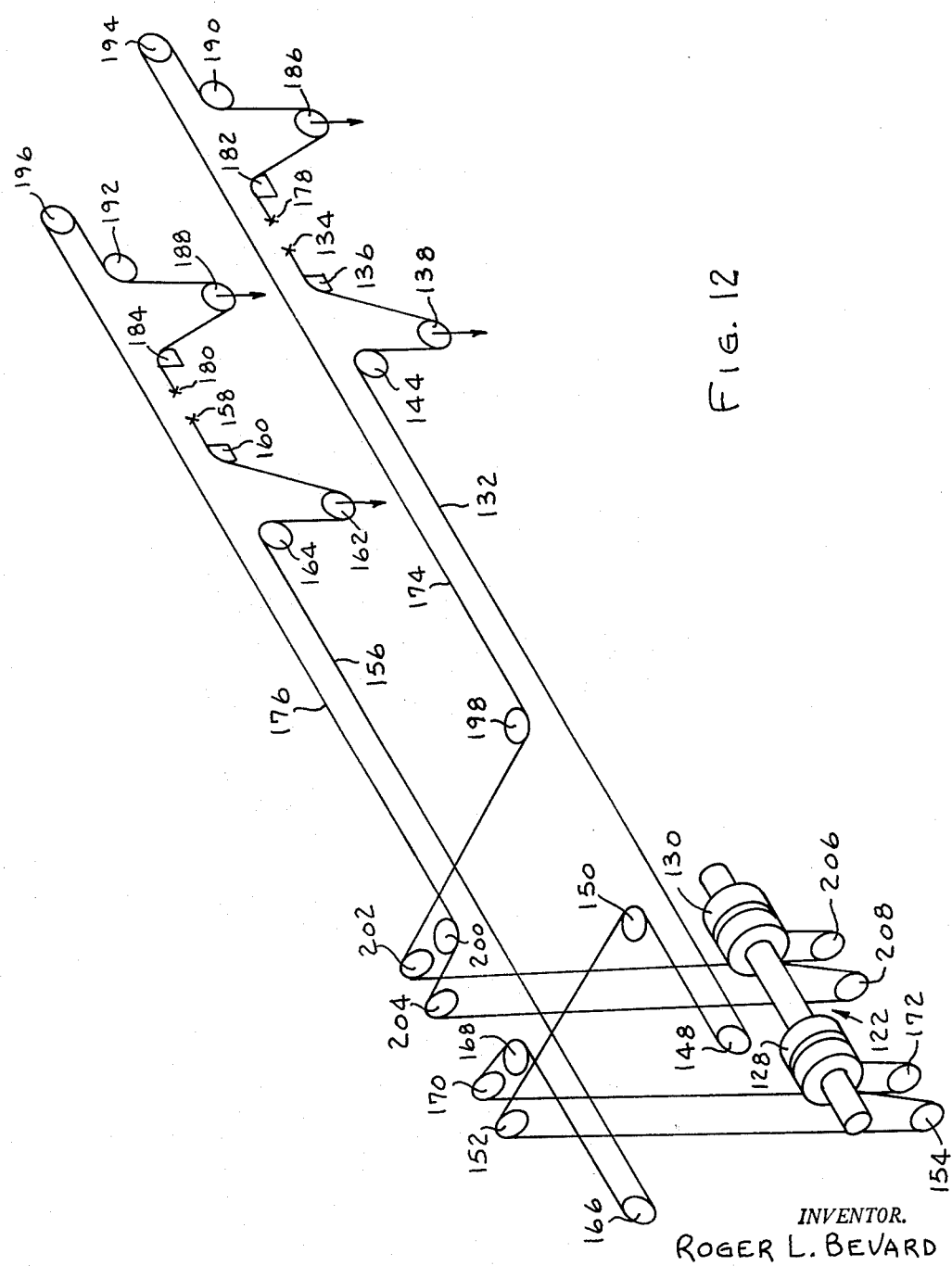

United States Patent Office 3,207,329
Patented Sept. 21, 1965

1

3,207,329
CARGO HANDLING APPARATUS
Roger L. Bevard, Iron Mountain, Mich., assignor to Lake Shore, Inc., Iron Mountain, Mich., a corporation of Michigan
Filed Dec. 3, 1962, Ser. No. 241,673
19 Claims. (Cl. 214—15)

This invention relates to load handling apparatus and more particularly, to ship mounted cargo handling apparatus.

The teachings of this invention are particularly well suited for use in combination with load handling apparatus which incorporates elongated load engaging means, such as spreaders which are usable in combination with cargo supporting pallets; however, it will be appreciated that in its broader aspects the invention is equally applicable to use with other types of load engaging means, such as load hooks or the like.

In unloading cargo from a ship the problem often arises of placing the load on a pier, or similar structure, when the ship is listing so that the load approaches the pier at an angle and an object of this invention is to provide an arrangement which will properly place a load on a pier from a listing ship. To this end, this invention proposes a hoist mechanism including a hoist cable which is associated with counterweight means. The counterweight means is mounted for movement in accordance with movement of the hoist cable and is supported in such a manner as to be stationary and inoperative when the spreader, or other suitable load engaging means, is being raised or lowered. Movement of the counterweight means occurs when the downward travel of the spreader is interruped, for example when the spreader engages the pier. The counterweight means is associated with control means for de-energizing the hoist mechanism, the control means being actuated in accordance with the movement of the counterweight means so that the hoist mechanism is de-energized with a time delay after payout is interrupted. The length of the time delay is preselected so as to insure payout of a sufficient amount of hoist cable to place the spreader, and load, flush onto the pier should the spreader approach the pier at angle due to a listing ship. The counterweight means and the hoist mechanism control are adjustable to accommodate virtually any amount of list which may be encountered and the movement of counterweight means during the time delay is also effective to take up cable paidout during the time delay which would otherwise result in slack cable.

Where a spreader, or other suitable elongated load engaging means, is utilized to handle cargo pallets, means is required for actuating the spreader to selectively engage and release the pallets. Another object of this invention is to provide load handling apparatus suitable for use with elongated load pallets with the actuation of the load handling apparatus being accomplished through a mechanism which functions effectively regardless of ship list and which maintains the compactness and relative simplicity of the load handling apparatus. For the achievement of this object it is proposed to provide a latching mechanism for moving the spreader into and out of engagement with the load and which includes an operating portion mounted on and movable with the spreader and a drive portion positioned remotely of the spreader. The operating and drive portions are connected by a cable which is associated with the counterweight means and the load handling crane in such a maner that the operating portion is movable with the spreader without such movement causing actuation thereof and does not produce slack cable when the spreader is lowered at an angle to the pier.

2

In ship mounted cargo handling apparatus it is generally desirable to provide an elongated boom which is movable relative to the ship and which supports the load engaging mechanism. Generally the elongated boom is movable athwart ship and the load engaging means can be connected for independent or synchronized movement with the boom as the latter moves relative to the ship thereby increasing both the versatility of the cargo handling apparatus as well as increasing the speed with which cargo can be loaded and unloaded from the ship.

A further object of this invention is to provide load handling apparatus of relatively simple construction having the hoist mechanism and the means for actuating the load engaging mechanism positioned remotely of boom and the load engaging means. In accordance with this invention it is proposed to raise and lower the load engaging means and to actuate the spreader latching mechanism with what, during movement of the boom and load engaging means relative to the ship, are in effect constant lengths of cables so that the movement occurs without affecting the latching mechanism, i.e. without prematurely actuating the spreader, and without affecting the desired vertical position of the load engaging means.

A still further object of this invention is then to provide cargo handling apparatus wherein an elongated boom supports a load trolley for movement relative to the ship and relative to the boom with the load engaging means supported from the load trolley being maintained in a predetermined vertical position relative to the boom during that movement.

Other objects and advantages will be pointed out in, or be apparent from the specification and claims, as will obvious modifications of the embodiment shown in the drawings, in which:

FIG. 1 is a generally schematic illustration of a typical installation;

FIG. 2 is a top plan view of the boom and load trolley;

FIG. 4 is a side elevation of the spreader and its connection in the load trolley;

FIG. 5 is a section view generally along lines 5—5 of FIG. 2;

FIG. 6 is an end view of the boom, load trolley and spreader;

FIG. 7 is a sectional view generally along lines 7—7 of FIG. 5;

FIG. 8 is an enlarged section view of the connection to the lower pallet engaging portion of the spreader;

FIG. 9 is a section view along lines 9—9 of FIG. 8;

FIG. 10 is a section view along lines 10—10 of FIG. 8;

FIG. 11 is a schematic illustration of the cable reeving arrangement between the load trolley and the boom together with an illustration of the means for automatically limiting the upper travel of spreader;

FIG. 12 is a schematic illustration of the hoist mechanism and cable arrangement; and FIG. 13 is a schematic illustration of the latching mechanism and cable arrangement.

Figure 3:
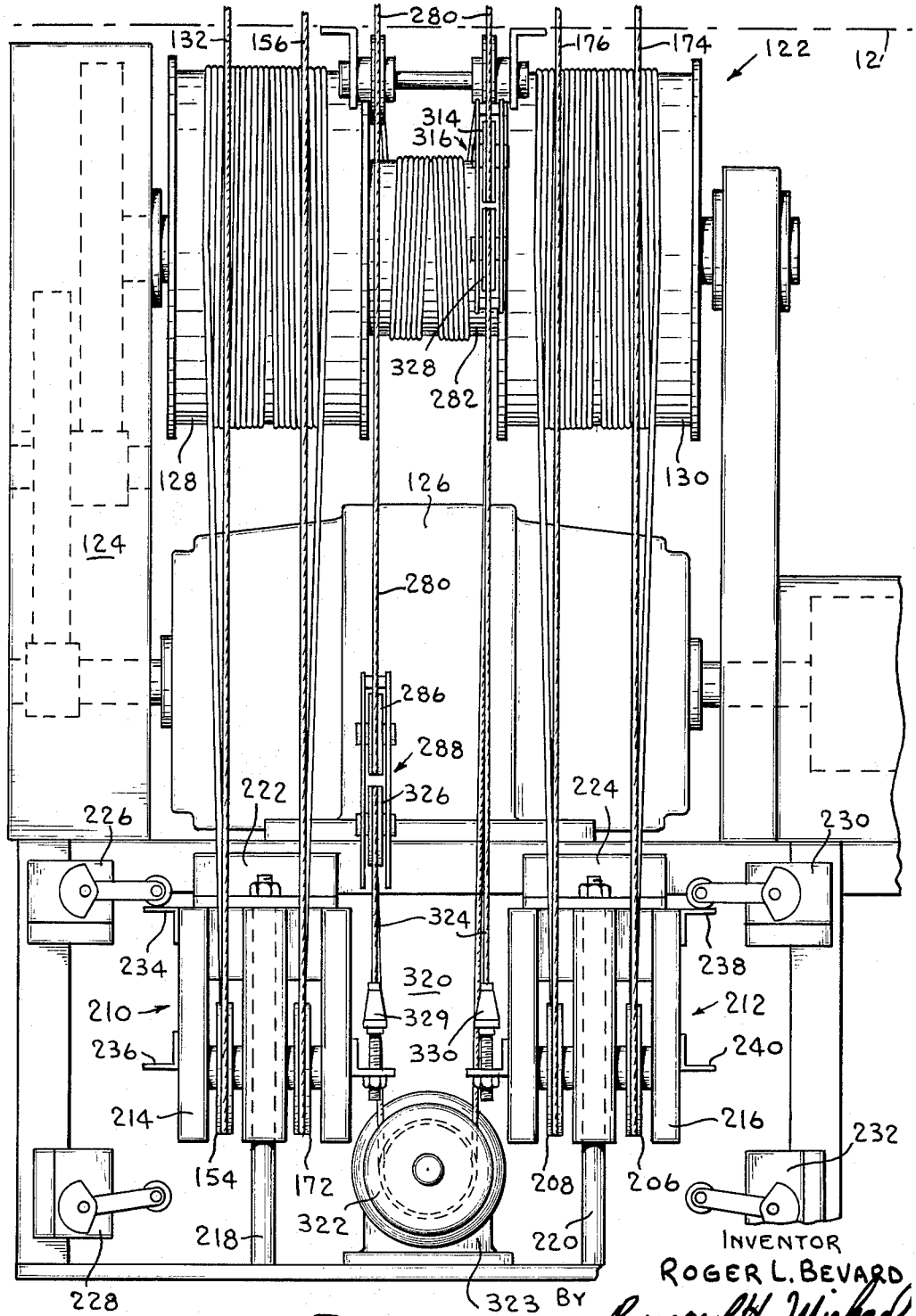
FIG. 3 is a view of the hoist and latching drive together with the counterweight arrangement.

A preferred embodiment of this invention is illustrated in FIG. 1 as being incorporated in cargo handling apparatus which is supported below decks of a ship for extension through ports provided in either side of the ship. More particularly, cargo handling apparatus 10 is supported from overhead 12 of a ship 14. The support for the cargo handling apparatus is well known and is schematically shown as including a plurality of rollers 16 supported from overhead 12 and engaging boom 18 of cargo handling apparatus 10. Cargo handling apparatus 10 also includes a load trolley 20 (see FIG. 2) and load engaging means 22 which is supported from the load trolley.

Boom 18 is moved athwart ship by a drive arrangement comprising gear racks 24 and 26 on boom 18 and pinions 28 and 30 engaging the racks and connected for rotation by a motor 32. Trolley 20 can be supported for movement with the boom and also for movement independent of the boom and in the illustrated preferred embodiment the load trolley and boom are interconnected for synchronized movement as a result of driven movement of the boom relative to the ship, a preferred arrangement for achieving this sychronized movement will be discussed more completely hereinafter. Energization of motor 32 drives boom 18 athwart ship and load trolley 20, with load engaging means 22, moves relative to the ship and to the boom so that the boom can be extended from either side of the ship and position the load engaging means over a pier 34, or other suitable cargo receiving structure. In this manner cargo can be transferred between pier 34 and the interior of the ship where it can be loaded into or unload from intermediate decks 36, 38, 40 and 42 within the ship.

Trolley 20 comprises relatively spaced end members 44 and 46 and relatively spaced side members 48 and 49. Rollers 50, 52, 54 and 56 are carried by trolley 20 and support the trolley for movement longitudinally of boom 18. Through a cable reeving arrangement which will now be described, trolley 20 is capable of synchronized movement with the boom so that the trolley is movable with and with respect to the boom. More particularly and with reference to FIGS. 2 and 11, flexible cable 58 extends from a bracket 60, which bracket is fixed with respect to the ship hull, and is reeved over sheave 62 supported from the left end of boom 18 by bracket 64. From sheave 62, cable 58 extends longitudinally of the boom to a sheave 66 supported from member 44 of trolley 20. Cable 58 is reeved over and extends from sheave 66 transversely of the boom to a sheave 68 also supported from trolley 20. In passing from sheave 66 to sheave 68 cable 58 is engaged by an idler pulley 70 to maintain the cable in a taut condition. From sheave 68, cable 58 extends to and is reeved on a sheave 72 supported from boom 18 by bracket 74 and is anchored at a bracket 76 fixed relative to the ship hull. Similarly a second cable 78 extends from bracket 60 to a sheave 80 supported at the right end of the boom by bracket 82, over a sheave 84 on the trolley and over an idler sheave 86 to sheave 88 also on trolley 20. From sheave 88 cable 78 is reeved over sheave 90 supported by bracket 92, and extends longitudinally of the boom and is anchored at bracket 76. Accordingly, boom 18 and trolley 20 are interconnected by fixed lengths of cable so that as the boom is driven athwart ship by the rack and pinion arrangement the trolley moves with the boom and, through cables 58 and 78, also with respect to the boom. With this arrangement synchronized movement of the boom and trolley is produced and as the boom is moved athwart ship, for example, at one foot per minute with respect to the ship, the trolley is also moved athwart ship but at a speed of two feet per minute with respect to the ship.

Trolley 20 carries cargo handling apparatus 22 which preferably takes the form of an elongated spreader 93 for selectively engaging and releasing pallets 94. The spreader comprises a pair of elongated side members 96 and 98 (see FIG. 6) each of which preferably includes two sections 100 and 102 so that the spreader is adapted to engage a pair of pallets arranged end to end. With particular reference to FIGS. 4, 6 and 7, spreader side portions 96 and 98 include upper horizontal structural members 104 and 106. A plurality of inverted, generally U-shaped structural members 108, 110, 112 and 114 (see FIG. 2) are connected between and engage structural members 104 and 106 through hinge connections 116 and 118. The inverted U-shaped members are constructed and arranged to nest within the rectangular trolley when the spreader is in its uppermost position. Through a spreader actuating mechanism to be described more completely hereinafter, side members 96 and 98 of the spreader can be pivoted about the hinge connections 116 and 118 to move pallet engaging members 119 and 120 into and out of engagement with pallets 94.

The cable system which supports cargo handling apparatus 22 from load trolley 20 is perhaps best illustrated in FIGS. 2, 3, 4 and 12. As will appear from the following discussion, the cable support arrangement also functions as the hoist means for raising and lowering the spreader. In the illustrated embodiment, a hoist drum 122 is driven by a motor 126 through a suitable gear drive 124. Hoist drum 122 includes two axially spaced sections 128 and 130. A first hoist cable 132 has one end connected to trolley 20 by a cable anchor 134. From cable anchor 134 cable 132 extends over cable guide 136, is reeved under sheave 138, which is rockably connected to horizontal structural member 104 by bracket 140 and pin 142, and passes over sheave 144 supported from trolley 22 by bracket 146. Cable 132 extends longitudinally of boom 18 and is reeved over sheave 148, which is supported from bracket 64 of boom 18, to sheave 150 supported from bracket 60 fixed with respect to the ship. From sheave 150 cable 132 is reeved over sheave 152, which similar to sheave 150 is fixed with respect to the ship hull, and extends downwardly to and is reeved under sheave 154 from which it extends upwardly to and is wound on section 128 of hoist drum 122. With relation to section 128 of the hoist drum, a second cable 156 extends from a cable anchor 158 on the load trolley over guide 160, under sheave 162 rockably connected to horizontal structural member 106 of the spreader, over sheave 164 along boom 18 to a sheave 166 supported by bracket 74. From sheave 166 cable 156 extends over sheave 168 mounted on bracket 76, to sheave 170 fixed relative to the ship hull and downwardly under sheave 172 from which it extends to and is wound on section 128 of the hoist drum. Similarly and with regard to section 130 of hoist drum 122, cables 174 and 176 extend from anchors 178–180 on trolley 20 over cable guides 182–184, under sheaves 186–188 rockably mounted on the horizontal structural members of side portions 104 and 106 and over sheaves 190 and 192. From sheaves 190-192, cables 174 and 176 extend to boom 18 where they are reeved on sheaves 194–196, extend longitudinally of the boom to sheaves 198–200 and passed to sheaves 202–204 from which they extend downwardly to and pass under sheaves 206–208 and are wound on section 130 of hoist drum 122. It will be appreciated that hoist cable pairs 132–156 and 174–176 can comprise separate lengths of cable or can be single cables arranged in a parbuckle connection with respect to their respective hoist drum sections and the cargo handling apparatus. It will be noted that the hoist drum and drive are located at a point remote from the boom and trolley and when the hoist drum is de-energized the hoist cables are in effect fixed lengths of cable which permit the hoist drum and drive to be so positioned to maintain relatively simplified cargo handlinng apparatus without creating any problem of either increasing or decreasing cable tension during synchronized movement of the boom and trolley. Furthermore, since the spreader is supported by what in effect are constant lengths of cable when the hoist drive is deenergized, the synchronized movement of boom and trolley with respect to the ship can occur without producing any fluctuation in the vertical position assumed by the spreader when the hoist drive is de-energized.

As is evident from FIG. 1, should ship 14 be listing spreader 93 would be lowered at an angle to the upper surface of pier 34. The cargo handling apparatus of this invention will place the pallets flush with the pier even if the ship is listing and will automatically de-energize the hoist mechanism when the spreader has been so placed. More particularly and with reference to FIG. 3, sheaves 154, 172, 206 and 208 are rotatably supported in counterweight assembly 210 and 212. The counterweight assemblies include bodies 214 and 216 which are supported for vertical movement on studs 218 and 220 which are fixed relative to the ship hull. The weight of counterweight assemblies 210 and 212 is less than the weight of spreader 98 so that as the spreader is raised and lowered counterweight assemblies are held in their uppermost position as illustrated in FIG. 3. Brackets 222 and 224 are fixed to the upper ends of studs 218 and 220 and limit the upper travel of the counterweight assemblies. When the downward travel of the hoist cables is interrupted so that the weight of the spreader is removed from either one or both of the counterweight assemblies, the hoist drum will continue to rotate and payout hoist cable, however, when this additional payout of cable occurs the counterweight assembly, or assemblies, move downwardly to take up and accommodate any excessive hoist cable payout.

Control means for the hoist drive is associated with the counterweights so that the hoist drive is controlled in accordance with the movement of the counterweights. More particularly, limit switches 226 and 228 are associated with counterweight assembly 210 and limit switches 230 and 232 are associated with counterweight assembly 212. Upper limit switches 226 and 230 are connected in the electric power supply for hoist motor 126 and when actuated are operative to reduce the speed of hoist motor 126 so that the hoist cable is then either heaved or paidout at a slower speed than normal. Lower limit switches 228 and 232 are effective to de-energize the hoist motor when engaged and actuated. Both counterweight assemblies 210 and 212 include upper and lower brackets 234-236 and 238-240 which are arranged to engage and actuate respective ones of the limit switches.

In operation and assuming the ship to be listing so that spreader 98 is being lowered at such an angle to pier 34 that the end of the spreader supported by cables 174 and 176 will be the first to engage pier 34, the right end of the spreader is the first to engage the pier. Engagement with the pier removes the weight of the spreader, with or without the cargo, from hoist cables 174 and 176 and counterweight 212 will begin to move downwardly on stud 220 as the hoist drum continues. Limit switch 230 is actuated and the speed of cable payout is reduced and payout of cable from both sections 128 and 130 continues, but at a reduced speed, even though one end of the spreader has engaged the pier. The payout of cables 174 and 176 after initial engagement of the spreader with the pier is accommodated by the downward travel of counterweight 212 which takes up the excess cable paidout and maintains cables 174 and 176 in a taut condition. When counterweight assembly 212 approaches the lower limit of its vertical travel, bracket 240 engages and actuates limit switch 232 to de-energize hoist motor 126 and thereby stop rotation of the hoist drum and payout of hoist cable bringing to an end the lowering operation. The relative positioning of the hoist switches with respect to counterweight assemblies is adjustable to accommodate the maximum expected degree of list of the ship and insure that the load is placed flush on the pier. After the left end of the spreader engages the pier, counterweight assembly 210 will move downwardly to take up any subsequent payout of hoist cables 132 and 156.

Since the counterweight assemblies are lighter than the spreader, when the hoist mechanism is again energized to lift either a loaded or unloaded spreader the counterweights will be raised to their uppermost position before movement of the spreader occurs. The counterweight reengages the upper limit switches so that the spreader will be raised at an increased speed.

It should be noted that the combination of the counterweight assemblies and the limit switches not only provide an automatic shutoff where the spreader is lowered at an angle to the pier but will also provide an automatic shutoff where the spreader is lowered flush with the pier.

Counterweight assemblies and the limit switch arrangements provide a lower limit on the vertical travel of the cargo handling apparatus whether the latter is being lowered into the hold of the ship or unto the loading pier. It has also been observed that it is also desirable to provide means for automatically limiting the upper travel of the spreader. A preferred arrangement for providing this upper limit on the travel of the spreader comprises an electrical control assembly 242, which can be any suitable type of elecrical control, such as one or two or more electrical limit switches as is a well known in the art, and a trip rod 244 movable to actuate the control assembly 242 and control the hoist motor 126. Accordingly, movement of the trip rod is accomplished through bell crank levers 252 and 260 which are connected to the trip rod by cables 246 and 254. The bell crank levers are pivotally supported at relatively spaced points along the longitudinal axis of the trolley and are arranged for engagement by the spreader as it is moved to its uppermost position. Cables 246 and 254 are reeved over sheave 248 and 256 located at opposite ends of the boom and connected to the trip rod so that pivotal movement of the levers is transmitted to and causes rotation of the trip rod. As the spreader approaches its uppermost position the bell crank levers are engaged and actuate control assembly 242 to de-energize the hoist motor. The use of two longitudinally spaced bell crank levers is preferred so that should the spreader be raised in a tilted position the uppermost edge thereof will engage one of the levers to de-energize the hoist motor before any damage can be done to either the cargo, the spreader or the trolley.

It may also be desirable to arrange one of the bell crank levers 260 to have a greater downward extension and to arrange the control assembly 242 so that, as the spreader is raised with respect to the trolley, lever 260 is initially engaged to actuate the control assembly and reduce the speed of the hoisting operation with lever 252 being subsequently engaged to de-energize the hoist motor and bring the hoisting operation to an end. This arrangement is particularly advantageous in that it affects the terminal end of the hoisting operation at reduced speed.

It will be appreciated that the particular arrangement of control assembly and bell crank levers is only one example of means for automatically limiting the upper travel of the spreader and that various other arrangements are possible and could be used.

With reference to FIGS. 2, 6, 7, and 13, the mechanism for actuating the spreader to selectively engage and release the load pallets by pivoting side members 96 and 98 of spreader 93 about hinge connections 116 will be described. Located generally centrally of each of the horizontal structural members 104 and 106 of side portions 96 and 98 and are vertically extending brackets 262 and 264. The vertical brackets are connected to the horizontal structural members and their upper ends are pivotally connected to drive screws 266 and 268 by links 270 and 272. The drive screws include oppositely threaded portions 274 and 276 which are engaged in a rotatable drum 278 so that as the drum is rotated the drive screws are oppositely advanced axially of the drum to pivot side members 96 and 98 either inwardly or outwardly.

Control over rotation of drum 278 is accomplished through means which includes a continuous cable 280 extending from the central portion 282 of hoist drum 122. Cable 280 passes over sheave 284 and extends downwardly to and is reeved under upper sheave 286 of a double block assembly 288. From the double block assembly, cable 280 passes upwardly and is reeved over sheave 290 supported from the ship hull over sheave 292 also supported from the ship hull to sheave 294 supported in brackets 296 on the left end of boom 18. From sheave 294, cable 280 extends longitudinally of boom 18 and is reeved over a sheave 298 supported on trolley 20 and under sheave 300 supported on spreader 93. Cable 280 is wound on drum 278 and extends under spreader sheave 302, over trolley sheave 304 to sheave 306 supported from bracket 308 carried on the right end of the boom. Cable 280 is reeved over sheaves 310 and 312 both fixed relative to the ship hull. From hull sheave 312, cable 280 extends downwardly and is reeved under upper sheave 314 of a double block assembly 316 and extends over hull sheave 318 to portion 282 of the hoist drum. With this arrangement the operating portion of the latching mechanism is carried by the spreader as it is raised and lowered and is operated by a cable which is paidout and heaved by the hoist drum simultaneously with the hoist cable so that the latching mechanism is not actuated as the spreader is raised and lowered. Since the latching cables and the hoist cables should be paidout at the same speed to maintain uniform tension and since in this instance the latching cable comprises a single length of cable whereas multiple lengths of cables are utilized for the hoist, the portion 282 of the hoist drum is constructed with a diameter which is one-half that of portions 128 and 130. With this arrangement, that is the combining of the hoist and latching cables into what in effect is a single cable reeving arrangement, the relative simplicity of the cargo handling apparatus is maintained. Furthermore, since latching cable 280 will in effect be a constant length of cable with the hoist drive de-energized the latching mechanism is not affected by the synchronized movement of boom trolley relative to the ship. With particular reference to FIGS. 3 and 13, manipulation of cable 280 to rotate drum 278 is accomplished by a latching drive 320 which includes a latch drum 322 driven from a source such as electric motor 323. Cable 324 is wound on latching drum 322, extends over lower sheaves 326 and 328 of double block assemblies 288 and 316 and has its opposite ends connected to counterweight assemblies 210 and 212 by cable anchors 329 and 330. Rotation of the latching drum 322, for example in a clockwise direction, exerts a downward force on double block 316 through cable 324 to produce a force on cable 280 to rotate drum 278 counterclockwise. It will be appreciated that simultaneously with movement of double block assembly 316 downwardly due to clockwise rotation of latch drum 322, the counterclockwise rotation of drum 278 will exert a force on the other side of cable 280 tending to raise double block assembly 288 so that a taut condition of cable 280 is maintained. Rotation of latching drum 322 in an opposite direction, counterclockwise, will effectuate rotation of drum 278 in a clockwise direction. In this manner the spreader side portions 96 and 98 can be selectively moved into and out of engagement with pallets 94. The connection of latching cables 324 and cable 280 through the double block assemblies produces a closed cable system whereby during driven movement of latch drum 322 the cables are paidout and heave so as to maintain a taut cable condition and without unduly tensioning the cables.

It can be noted that by anchoring cables 324 to counterweight assemblies 210 and 212 any excess payout of cable 280, which results during the time delay provided by the counterweight and limit switch arrangement to insure placing the pallets flush on the pier as discussed previously with respect to the hoist mechanism, will also be accommodated by the counterweight assemblies. That is as drum portion 282 continues to payout cable 280 during the time delay counterweight 210 and 212 will pull double block assemblies 288 and 316 downwardly to maintain a taut condition of control cable 280 so that the latching mechanism is also operative with a listing ship.

To increase the cargo handling capacity of apparatus constructed in accordance with this invention, spreader 93, as was mentioned above, includes two sections 100 and 102 and can accommodate two pallets. The spreader sections are operative to move jointly with the spreader and also relataive to each other to adjust for engagement with pallets which might be slightly misaligned. For convenience only one side portion 96, of the spreader will be described in detail and it will be appreciated that both spreader side portions are identical. More particularly and with reference to FIG. 4, section 100 includes a vertical structural member 332 connected to and depending from horizontal structural member 104. A pair of connecting struts 334 and 336 are hingedly connected to horizontal structural member 104 and to lower structural member 338 by bracket and pin combination 340 and 342. Connection of lower structural member 338 and vertical structural member 332 is established through T-bar and slot connection 347. T-bar connection 347 is illustrated in detail in FIGS. 8–10 and includes T-bar member 344 fixed to and movable with lower structural member 338. The T-bar is positioned in and movable axially relative to elongated bar guides 346 carried at the lower end of vertical structural member 332. The upper ends of guides 346 are provided with V-shaped grooves 348 and 350 positioned in diametrically opposed relationship for receipt of the V-shaped cross bar 352 of T-bar 344. Similarly, section 102 of spreader side portion 96 includes a vertical structural member 354, end struts 356 and 358 connected to upper structural member 104 and a lower structural member 360 with the connections between lower structural member 360 and vertical structural member 354 being completed by T-bar means 362 which is identical to that described with relation to section 100. A chain 364 interconnects section 100 and 102 so that the sections are connected for relative movement therebetween. Rollers 366 facilitate movement of the spreader side portions into and out of engagement with their respective pallets.

In operation as spreader 93 is lowered to the pier for engagement with a pallet, lower structural members 338 and 360 will engage the pier and the remainder of the spreader will continue downwardly with the T-bar connections 347 and 362 allowing relative movement between the lower structural member 338 and vertical structural member 332. As the structural members 332 and 354 are lowered with respect to the lower structural members, the cross bars of each T-bar is raised from the opposed V-shaped grooves to free the lower structural members for limited rotation with respect to their respective vertical structural members thereby allowing the spreader sections to properly align with their respective pallets for engagement therewith. After the pallets have been engaged and the spreader is being raised, the lower structural members 338 and 360 will remain on the pier as the vertical structural members 332 and 354 begin to rise. V-shaped grooves 348 and 350 will engage the T-bars and, should either of the lower portions of spreader have been slightly misaligned, the combination V-shaped grooves and V-shaped cross bars will rotate the lower sections of the spreaders to re-align the spreaders.

Although but one embodiment of the present invention has been illustrated and described, it will be apparent to those skilled in the art that various changes and modifications may be made therein without departing from the spirit of the invention or from the scope of the appended claims.

What I claim is:

1. Cargo handling apparatus comprising, in combination, generally elongated load engaging means, hoist means for raising and lowering said load engaging means and including at least a pair of cable means supporting said load engaging means from relatively spaced points thereon, and means connected to each of said cable means and operative to de-energize said hoist means with a predetermined time delay after downward travel of the cable means to which it is connected is interrupted and further operative during said time delay to accommodate payout of and maintain a taut condition of cable means the downward travel of which is interrupted so that if the downward travel of only a portion of said load engaging means and a corresponding one of said cable means is interrupted said hoist means continues payout of cable means during said time delay to continue lowering the remainder of said load engaging means and the interrupted cable means is maintained in a taut condition.

2. Cargo handling apparatus comprising, in combination, generally elongated load engaging means, hoist means for raising and lowering said load engaging means and including first and second cable means supporting said load engaging means at relatively spaced points thereon, counterweight means connected to each of said cable means and supported for movement in accordance with movement of said load engaging means, and control means operative to control energization of said hoist means and arranged for actuation in accordance with movement of said counterweight means, said counterweight means operative to actuate said control means to de-energize said hoist means with a predetermined time delay after the downward travel of the cable means connected to said counterweight means has been interrupted, said counterweight means further being mounted for movement to accommodate payout of and maintain a taut condition of said one cable means after the downward travel thereof has been interrupted so that if the downward travel of only a portion of said load engaging means and a corresponding one of said cable means is interrupted said hoist means continues payout of cable means during said time delay to continue lowering the remainder of said load engaging means and the interrupted cable means is maintained in a taut condition by said counterweight means.

3. The apparatus of claim 2 wherein said counterweight means are each supported by said cable means for vertical movement and are characterized by having a weight less than that of said load engaging means and arranged for support by said cable means in their uppermost position when said load engaging means is being raised and lowered by said hoist means, and wherein said control means is positioned for actuation by said counterweight means to de-energize said hoist mechanism when said counterweight means reaches its lowermost position.

4. Cargo handling apparatus comprising, in combination, load engaging means, hoist means for raising and lowering said load engaging means and including cable means supporting said load engaging means, counterweight means connected to and supported by said cable means for vertical movement in accordance with movement of said load engaging means, said counterweight means supported in an uppermost position when said load engaging means is being raised and lowered by said hoist means and movable from said uppermost position when the downward travel of the cable means by which it is supported is interrupted, and control means for controlling energization of said hoist means and arranged for actuation in accordance with movement of said counterweight means and to de-energize said hoist means with a predetermined time delay after the downward travel of said cable means has been interrupted, said hoist means continuing to payout cable means during said time delay to continue lowering said load engaging means if the downward travel of only a portion thereof is interrupted with said counterweight means being effective to accommodate and maintain a taut condition of said cable means during said time delay.

5. Cargo handling apparatus comprising, in combination, an elongated movable boom, load engaging means supported for movement with and with respect to said elongated boom, hoist means for raising and lowering said load engaging means and including elongated cable means connected to said load engaging means, counterweight means supported by said cable means for movement between first and second extreme positions in accordance with movement of said load engaging means, said counterweight means and said cable means so arranged that said counterweight means is held in said first position when said load engaging means is being raised and lowered and is movable from said first position to said second extreme positon after the downward travel of the cable means by which it is supported is interrupted, and control means for controlling energization of said hoist means and arranged for engagement with said counterweight means as said counterweight means assume said second position to de-energize said hoist means with a predetermined time delay after the downward travel of said cable means is interrupted with said counterweight means being movable to maintain said cable means in a taut condition during said time delay, said hoist means continuing to payout cable means during said time delay to continue lowering said load engaging means if the downward travel of only a portion thereof is interrupted with said counterweight means being effective to accommodate and maintain a taut condition of said cable means during said time delay.

6. The cargo handling apparatus of claim 5, wherein said control means includes a control device positioned adjacent each of said extreme positions of said counterweight means with the control device adjacent said first position operative when actuated to reduce the speed of said hoist means and said control device adjacent said second extreme position operative when actuated to de-energize said hoist means.

7. The cargo handling apparatus of claim 5 wherein said load engaging means comprises an elongated structure and also including control means for controlling said hoist means to establish the upper limit of travel of said load engaging means, said control means including a pair of actuators connected to said hoist means and relatively spaced in longitudinal direction with respect to said load engaging means, one of said actuators extending to a point below the other and operative when engaged to reduce the speed of said hoist means and the other of said actuators operative when engaged to actuate said control device to de-energize said hoist means.

8. Cargo handling apparatus comprising, in combination, means movable to selectively engage and release a load, hoist means for raising and lowering said load engaging means and including first cable means connected to said load engaging means, means for moving said load engaging means to selectively engage and release said load and including second cable means, means for heaving and paying out said second cable means, counterweight means connected to said first and second cable means and supported for movement in accordance with movement of said load engaging means, and means responsive to said movement of said counterweight means for de-energizing said hoist means with a predetermined time delay after the downward travel of said first cable means is interrupted, said hoist means continuing to payout said first cable means during said time delay and said counterweight means also arranged for movement to accommodate payout of said first and second cable means when the downward travel thereof is interrupted and during said predetermined time delay.

9. Cargo handling apparatus comprising, in combination, means movable to selectively engage and release a load, hoist means for raising and lowering said load engaging means and including first cable means connected to said load engaging means, counterweight means connected to said first cable means and supported for movement in accordance with movement of said load engaging means, means responsive to said movement of said counterweight means for de-energizing said hoist means with a predetermined time delay after the downward travel of said first cable means is interrupted, said hoist means continuing to payout said first cable means during said time delay and said counterweight means supported for movement to accommodate payout of said first cable means when the downward travel thereof is interrupted and during said predetermined time delay, means for actuating said load engaging means to selectively engage and release the load, said actuating means including second cable means connected to said hoist means for movement simultaneously with said first cable means and also including third cable means connected to said second cable means for moving said second cable means independently of said hoist means to operate said load engaging means to selectively engage and release said load, said third cable means normally inoperative when said hoist means is raising and lowering said load engaging means and connected to said counterweight means so that said counterweight means is operative to accommodate payout of said second cable means when the downward travel thereof is interrupted and during said time delay.

10. Cargo handling apparatus comprising, in combination, generally elongated load engaging means, hoist means for raising and lowering said load engaging means and including first and second cable means supporting said load engaging means at relatively spaced points thereon, counterweight means engaging said first and second cable means and supported for movement in accordance with movement of said load engaging means, means operative to control energization of said hoist means and arranged for actuation in accordance with movement of said counterweight means to de-energize said hoist means with a predetermined time delay after the downward travel of at least one of said cable means has been interrupted, said hoist means continuing to payout said first and second cable means during said time delay and said counterweight means also arranged to accommodate during said time delay payout of and maintain a taut condition of cable means the downward travel of which has been interrupted, third cable means connected to said load engaging means and to said hoist means for movement simultaneously with said first and second cable means, fourth cable means connected to said third cable means, and drive means connected to said fourth cable means and operative when energized to move said fourth cable means for operation of said third cable means to operate said load engaging means to selectively engage and release a load, said fourth cable means normally inoperative when said hoist means is raising and lowering said load engaging means and connected to said counterweight means so that said counterweight means accommodates excess payout of said third cable means when its downward travel is interrupted.

11. The cargo handling apparatus of claim 10 wherein said actuating means for said load engaging means includes operating means supported on said load engaging means and operative when actuated to provide the selective movement of said load engaging means, said third cable connected to said operating means, and drive means connected to said fourth cable means for moving said fourth cable means to displace said third cable means independently of said first and second cable means to actuate said operating means.

12. Cargo handling apparatus comprising, in combination, an elongated movable boom, means supported for movement with and with respect to said elongated boom and operative to selectively engage and release a load, hoist means for raising and lowering said load engaging means and including first cable means connected to said load engaging means, counterweight means engaging said first cable means and supported for movement between extreme positions in accordance with movement of said load engaging means, means including second cable means connected to and operative to control the movement of said load engaging means to selectively engage and release the load, said counterweight means connected to said second cable means and arranged with respect to said first and second cable means to be held in one of its extreme positions as said load engaging means is being raised and lowered and is movable from said one position to its other extreme position after the downward travel of said first cable means is interrupted, and means for controlling energization of said hoist means and arranged for engagement by said counterweight means as said counterweight means assumes its other position to de-energize said hoist means with a predetermined time delay after the downward travel of said first cable means is interrupted, said hoist means continuing to payout cable means during said time delay to continue lowering said load engaging means if the downward travel of only a portion thereof is interrupted with said counterweight means being effective to maintain said first and second cable means in a taut condition during said time delay.

13. The cargo handling apparatus of claim 12 wherein said first and second cable means comprise generally constant lengths of cable reeved on said elongated boom and said load engaging means so that said load engaging means maintains a predetermined vertical position during said relative movement of said boom and load engaging means and said actuating means for said load engaging means is not acuated during said relative movement.

14. The cargo handling apparatus of claim 12 wherein load engaging means comprises two elongated portions each arranged for engagement with a separate load pallet, and means for providing relative movement between said portions of said load engaging means comprising a pair of members connected for relative vertical and rotational movement, said members having a first interlocking position wherein they are held against relative rotational movement and movable from said first position when the downward travel of said load engaging means is interrupted to free said members for relative rotational movement therebetween to accommodate misalignment in said load pallets.

15. Shipboard mounted cargo handling apparatus adapted for use in raising and lowering a load from a listing ship whereby said load may be suspended at an angle to the horizontal, said cargo handling apparatus comprising, in combination, load engaging means, cable means connected to said load engaging means, means for driving said cable means to raise and lower said load engaging means, counterweight means connected to said cable means and supported for movement in accordance with movement of said load engaging means, and means operative in response to movement of said counterweight means for controlling energization of said drive means so that said drive means is de-energized with a predetermined time delay after the downward travel of said cable means is interrupted, said hoist means continuing to payout cable means during said time delay and said time delay being of sufficient duration to compensate for the angle at which said load is disposed with said counterweight means also operative to maintain said cable means in a taut condition during said time delay.

16. Shipboard mounted cargo handling apparatus adapted for use in raising and lowering a load from a listing ship whereby said load may be suspended at an angle to the horizontal, said cargo handling apparatus comprising, in combination, load engaging means; first and second cable means connected to said load engaging means, means for driving said cable means to raise and lower said load engaging means, counterweight means connected for movement between two extreme positions, said counterweight means connected to both said first and second said cable means and held thereby in one of said extreme positions as said load engaging means is being raised and lowered and movable to the other of said extreme positions when the downward travel of at least one of the cable means to which the counterweight means is connected is interrupted, and control means connected to said drive means and positioned adjacent said other position for engagement by said counterweight means to de-energize said drive means with a predetermined time delay after the downward travel of at least one of said cable means is interrupted, said hoist means continuing to payout cable means during said time delay and said time delay being of sufficient duration to compensate for the angle at which said load is disposed with said counterweight means operative during said time delay to accommodate payout of and maintain a taut condition of cable means the downward travel of which is interrupted so that if the downward travel of only a portion of said load engaging means and a corresponding one of said cable means is interrupted said hoist means continues payout of cable means during said time delay to continue lowering the remainder of said load engaging means and the interrupted cable means is maintained in a taut condition.

17. Shipboard mounted cargo handling apparatus adapted for use in raising and lowering a load from a listing ship whereby said load may be suspended at an angle to the horizontal, said cargo handling apparatus comprising, in combination, means movable to selectively engage and release a load, hoist means including first cable means connected to said load engaging means for raising and lowering said load engaging means, counterweight means connected for movement between first and second extreme positions, said counterweight means supported by said first cable means in said first position as said load engaging means is being raised and lowered and movable from said first to said second position when the downward travel of said load engaging means is interrupted, control means connected to said hoist means and positioned adjacent said second position for engagement by said counterweight means as it approaches said second position to de-energize said hoist means with a predetermined time delay after the downward travel of said first cable means is interrupted, said hoist means continuing payout of said first cable means during said time delay and said time delay being of sufficient duration to compensate for the angle at which said load is disposed with said counterweight means also operative to maintain said first cable means in a taut condition during said time delay, means for actuating said load engaging means to selectively engage and release a load and including second cable means connected to said hoist means and driven thereby simultaneously with said first cable means, and means for moving said second cable means independently of said first cable means to provide said selective movement of said load engaging means, said second cable means also connected to said counterweight means and said counterweight arranged so that movement thereof to said second position is effective to accommodate payout of said second cable means during said time delay to maintain a taut condition thereof.

18. The cargo handling apparatus of claim 17 including an elongated boom adapted to be mounted on a ship for movement relative thereto, said load engaging means being supported from said boom for movement with and with respect to said boom, and wherein said hoist means and said counterweight means are located on said ship at a position remote from said boom and said load engaging means.

19. The cargo handling apparatus of claim 18 wherein said actuating means includes an operating portion positioned on and movable with said load engaging means, a drive portion positioned on said ship at a position remote from said boom and said load engaging means, and said second cable means operatively connects said operating and drive portions.

References Cited by the Examiner

UNITED STATES PATENTS

| | | | |
|---|---|---|---|
| 130,112 | 8/72 | Drew | 254—175 X |
| 789,981 | 5/05 | Lobnitz | 254—175 X |
| 2,541,893 | 2/51 | Speer | 214—15 |
| 2,665,937 | 1/54 | Reigh | 294—67 |
| 2,938,638 | 5/60 | Kersh | 214—15 |
| 2,987,339 | 6/61 | Kaplan et al. | 294—67 |
| 3,042,227 | 7/62 | Tantlinger | 214—15 |
| 3,086,661 | 4/63 | De Stasi | 294—67 X |

FOREIGN PATENTS 783,408  9/57  Great Britain.

HUGO O. SCHULZ, *Primary Examiner.*

GERALD M. FORLENZA, *Examiner.*

UNITED STATES PATENT OFFICE
CERTIFICATE OF CORRECTION

Patent No. 3,207,329                       September 21, 1965

Roger L. Bevard

It is hereby certified that error appears in the above numbered patent requiring correction and that the said Letters Patent should read as corrected below.

Column 12, line 19, before "load" insert -- said --.

Signed and sealed this 19th day of April 1966.

(SEAL)
Attest:

ERNEST W. SWIDER                        EDWARD J. BRENNER
Attesting Officer                          Commissioner of Patents